(12) United States Patent
Yu

(10) Patent No.: US 6,352,167 B1
(45) Date of Patent: Mar. 5, 2002

(54) COMBINATION OF TOOL BOX WITH FUEL TANK

(76) Inventor: Ting-Ho Yu, 45, 6F-10, 8 St, Tung Village, Tai-ping City, Taichung Hsien (TW)

( * ) Notice: Subject to any disclaimer, the term of this patent is extended or adjusted under 35 U.S.C. 154(b) by 0 days.

(21) Appl. No.: 09/838,309

(22) Filed: Apr. 20, 2001

(51) Int. Cl.⁷ .............................................. B65D 21/00
(52) U.S. Cl. .................. 220/522; 220/23.4; 220/23.83
(58) Field of Search ............................. 220/4.12, 4.22, 220/521, 522, 23.83, 23.4, 23.8

(56) References Cited

U.S. PATENT DOCUMENTS

| | | | | |
|---|---|---|---|---|
| RE17,204 E | * | 2/1929 | Johnson | 220/23.4 |
| 3,658,204 A | * | 4/1972 | Bottger | 220/23.4 |
| 4,067,475 A | * | 1/1978 | Pinkau et al. | 220/23.4 |
| 4,813,542 A | * | 3/1989 | Thompson et al. | 220/23.6 |
| 5,553,712 A | * | 9/1996 | Tisbo et al. | 220/522 |
| 5,575,401 A | * | 11/1996 | Trower et al. | 220/522 |
| 6,083,579 A | * | 7/2000 | Schurman | 220/522 |
| 6,164,442 A | * | 12/2000 | Strautz | 220/522 |

* cited by examiner

Primary Examiner—Joseph M. Moy
(74) Attorney, Agent, or Firm—Rabin & Berdo, P.C.

(57) ABSTRACT

This invention relates to a structural combination of a tool box with a fuel tank, mainly comprising a tool box structure and a fuel tank structure, a simple and robust correlative combination for consolidated storage. The tool box stands independently in opening and closing operation, which is easy for the operator to take off and put back the tool, and the fuel tank permits to be separated from the combination for independent use.

1 Claim, 4 Drawing Sheets

COMBINATION OF TOOL BOX WITH FUEL TANK

FILED OF THE INVENTION

This invention relates to a structural combination of a tool box with a fuel tank, mainly comprising a tool box structure and a fuel tank structure, a simple and robust correlative combination for consolidated storage.

BACKGROUND OF THE INVENTION

It is a well-known fact that the automobile trunk is generally used for storing assorted materials, such as the battery rescue cable, the pressure gauge, the tire hand pump, any tool box, even the empty fuel tank for an emergent purchase of fuel when it runs short. However, the tool box and the fuel tank are generally in separate form, never in a combined structure in the market. It requires a larger space to store two items than one.

The inventor has been working for years on the design of the tool box case and was inspired to shift attention to the research, design and fabrication of such a combination of a tool box with a fuel tank.

The main object of the invention is to provide a structural combination of a tool box with a fuel tank which is easy and simple to integrate into the tool box to become an integral storage device without occupying too much space.

Another object of the invention is to provide a structural combination of a tool box with a fuel tank in which the tool box permits ease for opening and closing while taking off the tool out of the tool box. The tool box stands firmly with practical application.

Another object of the invention is to provide a structural combination of a tool box with a fuel tank in which the fuel tank permits to be separated from the tool box for independent use.

SUMMARY OF INVENTION

The invention concerns a structural combination of a tool box with a fuel tank, mainly comprising a fuel tank which is sandwiched between the open space of a split tool box for the consolidated storage. In application, the fuel tank can be taken off from the tool box when it is necessary to fill it with fuel reserved as a stand-by fuel. The tool box stands upright for opening and closing, expedient to take off and put back the tool.

The design utilizes two half tool box casings, the left half box casing and the right half box casing with an upright panel standing between them. The upright panel works to hold on the fuel tank. When two half box casings are closed, the fuel tank is resolutely sandwiched between to form an integral part for consolidated storage space. The fuel tank allows to be taken off for separate use. When the tool box is opened, it stands uprightly on the ground, convenient for accessing to the tool.

This invention mainly comprises a tool box structure and a fuel tank structure, a simple and robust correlative combination for consolidated storage. The tool box stands independently in opening and closing operation, which is easy for the operator to take off and put back the tool, and the fuel tank permits to be separated from the combination for independent use.

The technical applications, features and efficiency of the invention will be explained in great detail with the aid of embodiments as illustrated in the drawings.

Figure 1:
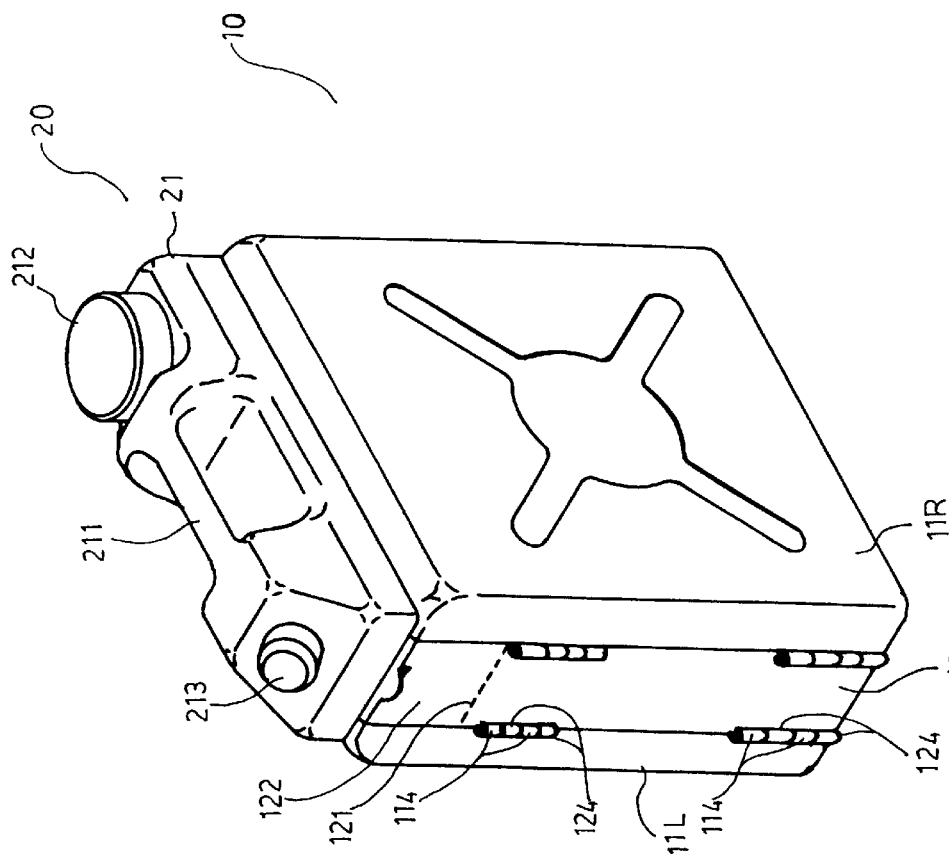
FIG. 1 shows the stereo diagram of a whole appearance of the invention.
Figure 2:
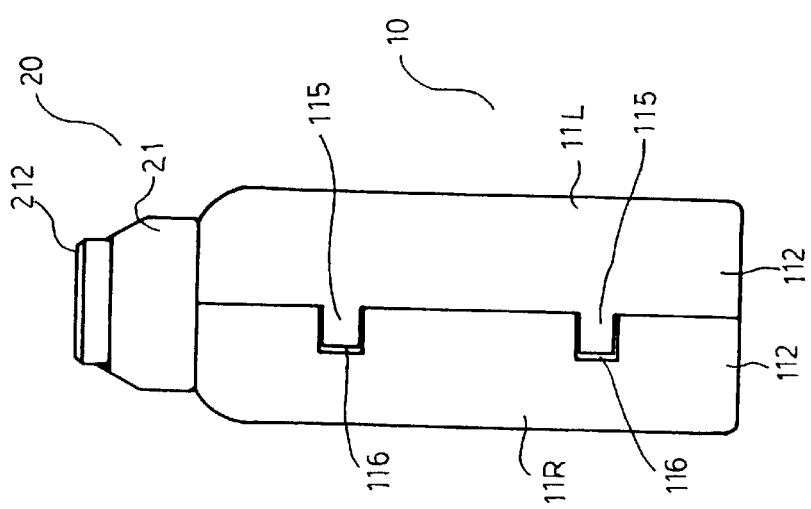
FIG. 2 is a back view of a whole appearance of the invention.
Figure 3:
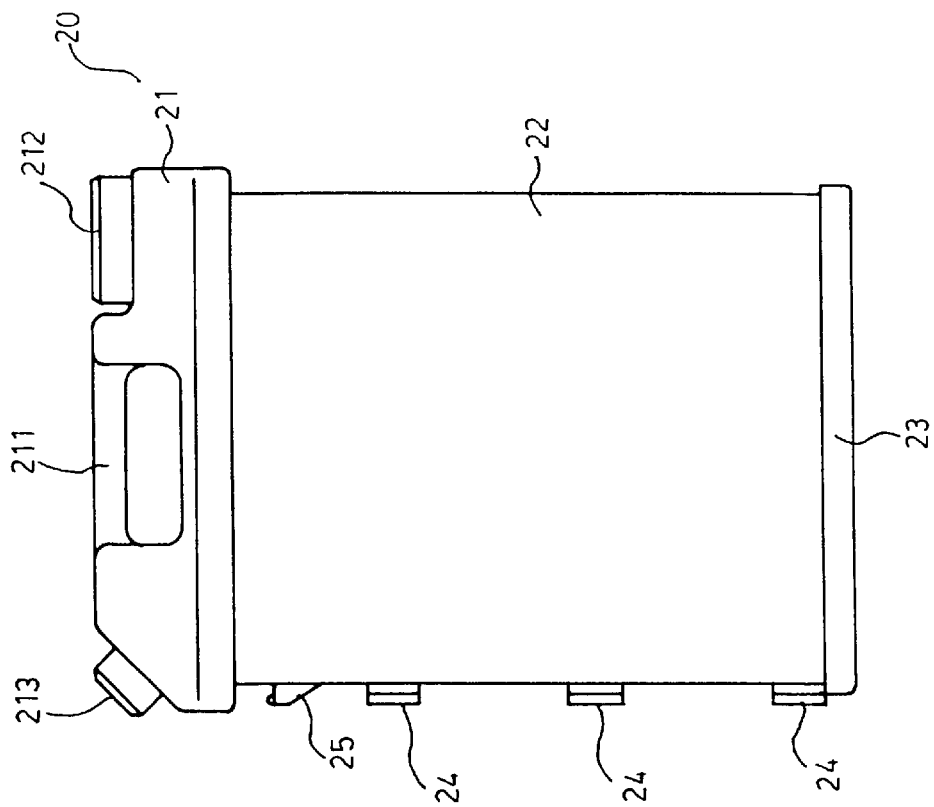
FIG. 3 shows the stereo diagram of a whole appearance of the fuel tank of the invention.
Figure 4:
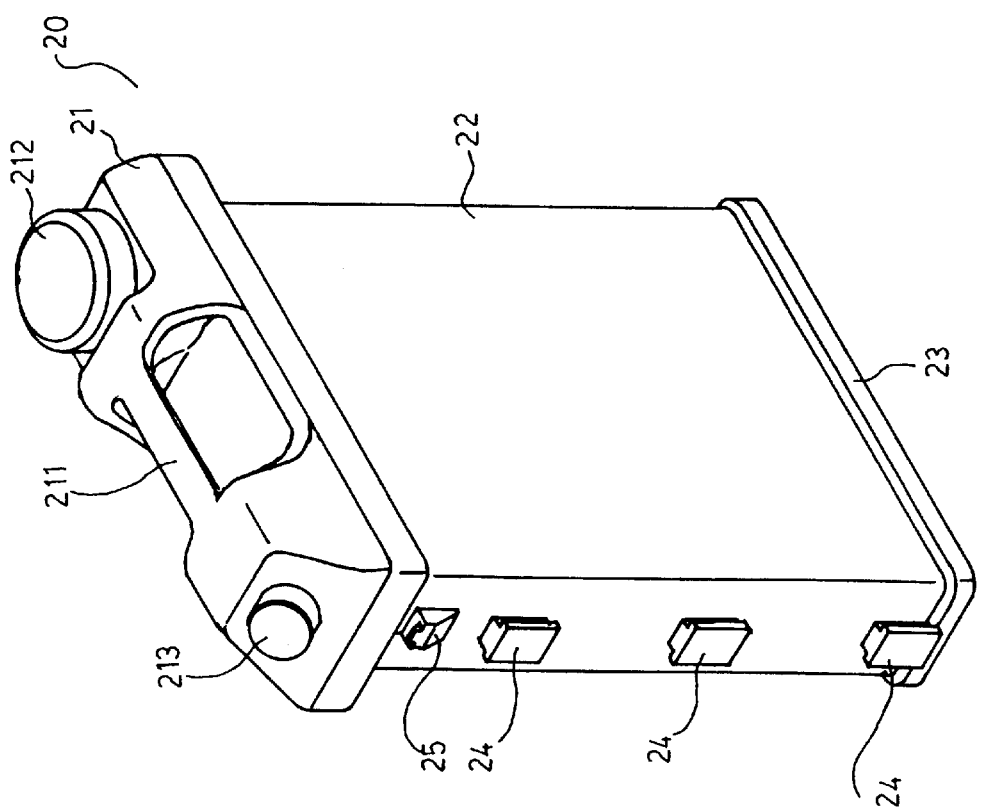
FIG. 4 is a side view of a whole appearance of the fuel tank of the invention.
Figure 5:
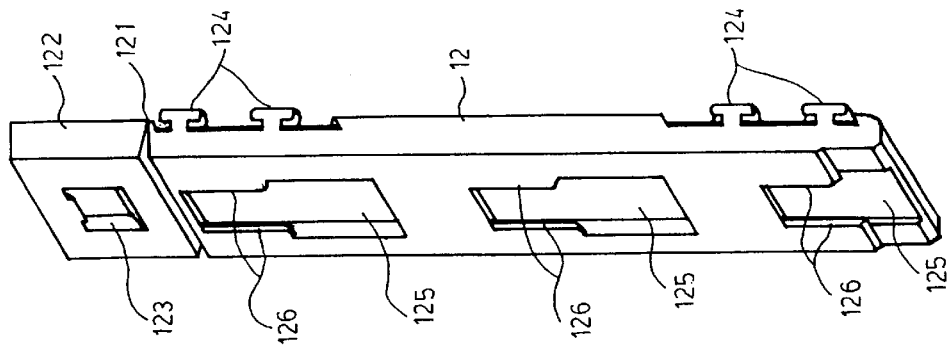
FIG. 5 shows the stereo diagram of an appearance of the upright panel of the invention.
Figure 6:
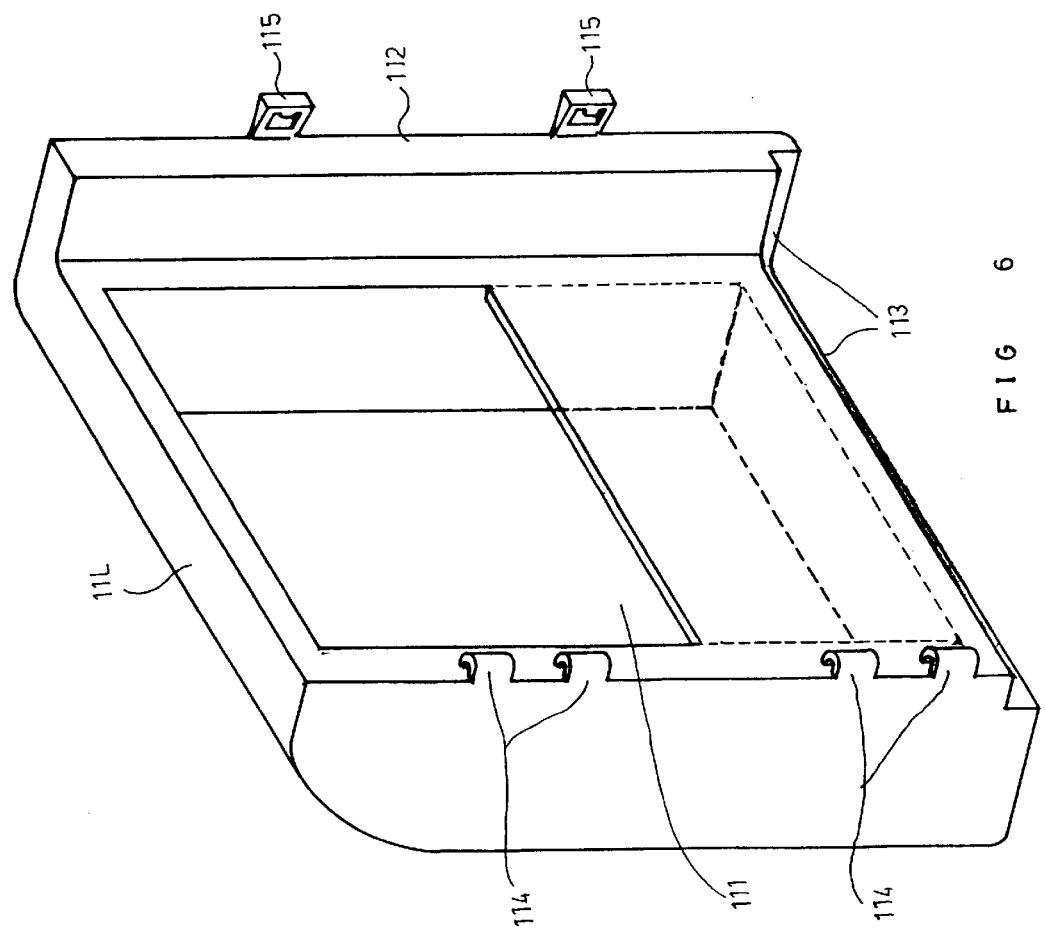
FIG. 6 shows the stereo diagram of an appearance of a half box casing of the invention.

| Name and Number of Components | | |
|---|---|---|
| 10 Tool Box | 11L Left casing | 11R Right casing |
| 12 Upright panel | 111 Storage space | 112 Side panel |
| 113 Slotted rim | 114 Hinging joint | 115 Buckle |
| 116 Buckle slot | 121 Thin wall | 122 Moveable part |
| 123 Buckle slot | 124 Hinging joint | 125 Slot |
| 126 Clamp | 20 Fuel tank | 21 Tank top |
| 211 Handle | 212 Inlet | 213 Outlet |
| 22 Fuel tank body | 23 Flange | 24 Joint block |
| 25 Buckle block | | |

DETAILED DESCRIPTION OF THE INVENTION

As shown in the figures, the combination of a tool box with a fuel tank of the invention mainly constitutes a tool box structure 10 and a fuel tank structure 20 incorporated into a consolidate storage, wherein:

The tool box 10 comprises a pair of symmetrically arranged left half casing 11L a right half casing 11R and an upright panel 12. The storage space 111 contained in the left and right casings 11L and 11R is molded in diverse shapes for storing assorted tools (which is a general feature, so it not presented in the figures.) The half casings 11L and 11R provide a 90° bent side panel 112. One of the side panels 112 outfits with two buckles 115 and other side panel 112 with two buckle slots 116. On the bottom rim of the half casings 11L and 11R, there is a set-in slotted rim 113. Both inner sides of the half casing 11L and 11R furnish a hinging joint 114; the upright panel 12 has a thin panel 121 on the top to connect to a moveable part 122 and a buckle slot 123. The upright panel has two hinging joints 124 which are staggered corresponding to the hinging joints 114 on the left and right half casings 11L and 11R, and a pivot pin unites the joints together to form reliable hinges among the left half casing 11L, the partition panel 12 and the right half casing 11R for easy opening and closing operation. The partition panel 12 further provides slots 125 with the clamps 126 mounted within the slots.

The fuel tank 20 is a popular one. The top 21 of the fuel tank 20 yields an handle 211, an inlet 212 and an outlet 213 with covers. The tank body 22 and the tank top 21 are designed with reduced size. On the periphery of the tank body 22, there is a flange 23 with three T-shape joint blocks 24 and one buckle block 25 to the top.

As shown in the FIGS. 1 through 8, the upright panel 12 is linked together with the left and right half casings 11L and 11R by inserting a pivot pin through the joints 114 and 124. The side panels 112 of the left casing 11L and the right casing 11R are in the face to face contact while in the close position and contain a space 22 sufficient enough to receive the fuel tank 20 when incorporated with the upright panel 12.

Figure 7:
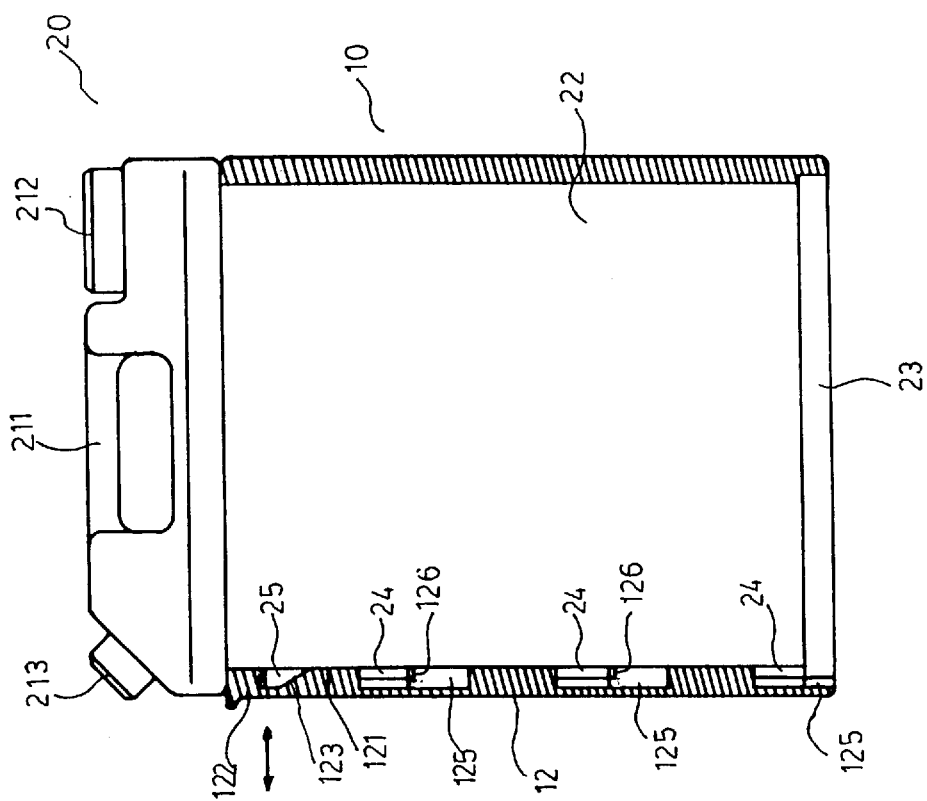
FIG. 7 shows the longitudinal cross section of a combination of a tool box with a fuel tank of the invention.
Figure 8:
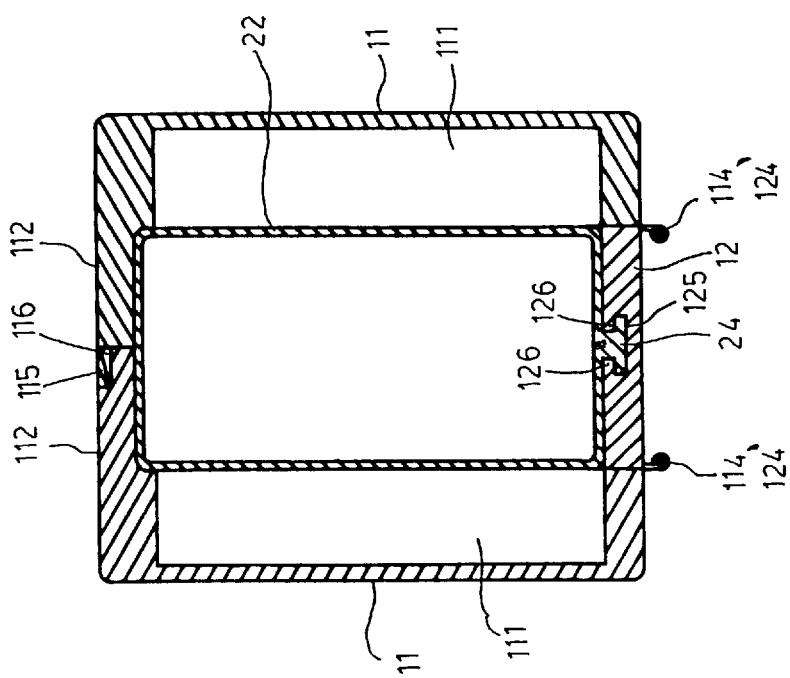
FIG. 8 shows the horizontal section of a combination of a tool box with a fuel tank of the invention.

As shown in FIGS. 7 and 8, when the left and right half casings 11L and 11R are opened at a certain angle against the upright panel 12, the three T-shape joint block 24 will enter three slots 125 on the upright panel 12. While the T-shape joint blocks 24 move upward, being held firmly in place by the clamp 126 within the slots 125 to prevent the joint blocks 24 from disengagement. Upon completion of union of joint blocks within the slots, the moveable part 122 of the thin panel 121 on the top of the upright panel 12 moves close to the tank body 22. The slot 123 of the moveable part 22 will accept the buckle bloc 25 on the top of the tank body 22, the moveable part 122 exercises a pressing force to hold the tank body top 21 in a manner to confine the down slide the fuel tank 20 may take and hold the fuel tank 20 in place on the upright panel 12. Reversibly, if it is intended to take the fuel tank 20 off for independent use, the moveable part 122 is pushed outward to disengage the buckle block 25 out of the slot 123, the tank body 22 is allowed to slide down, the T-shape joint blocks 24 leave the clamp 126 in the slot 125, the fuel tank 20 is thus allowed to be taken transversely off the upright panel 12.

As shown in FIGS. 1, 2, 7 and 8, when the fuel tank 20 is sandwiched in the tool box 10, two half casings 11L and 11R are in the relatively close position, the buckle 115 enters the slot 116 to lock the casings resolutely, the top of the left and right half casings 11L and 11R and the upright panel press on the top rim 21 of the fuel tank 20. The set-in slotted rim 113 of the half casings 11L and 11R will receive the crop-up bottom flange 23 on the tank body 22 for interlocking effect, plus the insertion of the T-shape joint block 25 of the tank body 22 into the slot 125 of the upright panel 12, it is easy for the operator to grasp the handle 211 of the fuel tank 20 and carry along the tool box 10 even with heavy tool load. The tool box 10 is easy to open and close and access to the tool even with the fuel tank sandwiched thereon.

Viewing from above statement, it is understood that the combination of a tool box with the fuel tank described in the invention has in reality a simple and practical application. It is able to them together or separated for independent use so as to enhance its value.

I claim:

1. A combination of a tool box with a fuel tank mainly comprises a tool box structure and a fuel tank structure to form an integral part, wherein:

the tool box comprises a pair of symmetrically arranged left half casing, a right half casing and an upright panel with a spacious room for storing assorted tools, wherein outside of the left and right casings, there is a section of side panel in 90°, wherein one side panel outfits with two buckles and the other side panel has the corresponding slots, wherein the left and right casings provide a set in slot on the bottom rim and the hinging joins on the inner side, wherein the upright panel has a thin panel on the top with a moveable part that is outfitted with buckle slot, wherein there are hinging joints on both sides of the upright panel and three slots in adequate length, in which a clamp is installed, and wherein the hinging joints on the left and right casing can be staggered with the hinging joints on the upright panel and linked together to form a hinge by inserting a pivot pin;

the tank body of the fuel tank is reduced in size so the periphery of the tank top differs from that of the tank body, wherein the tank body has a peripheral flange, three T-shape joint blocks on the front rim and a buckle on the top;

the above-mentioned tool box structure and the fuel tank structure are united to form an integral combination for consolidated storage.

\* \* \* \* \*